(12) United States Patent
Shin et al.

(10) Patent No.: US 7,388,630 B2
(45) Date of Patent: Jun. 17, 2008

(54) LIQUID CRYSTAL DISPLAY HAVING PARTICULAR SUB-PIXELS

(75) Inventors: Kyong-Ju Shin, Yongin-si (KR); Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 801 days.

(21) Appl. No.: 10/914,082

(22) Filed: Aug. 10, 2004

(65) Prior Publication Data

US 2005/0068281 A1     Mar. 31, 2005

(30) Foreign Application Priority Data

Aug. 11, 2003  (KR)  ............... 10-2003-0055418

(51) Int. Cl.
  *G02F 1/1335*  (2006.01)
  *G02F 1/1343*  (2006.01)
(52) U.S. Cl. .................. 349/109; 349/108; 349/143
(58) Field of Classification Search ........... 349/108, 349/109, 143, 84
See application file for complete search history.

(56) References Cited

U.S. PATENT DOCUMENTS

| | | | | |
|---|---|---|---|---|
| 6,335,777 | B1 * | 1/2002 | Yokoyama et al. | 349/133 |
| 2004/0169807 | A1 * | 9/2004 | Rho et al. | 349/139 |
| 2005/0128224 | A1 * | 6/2005 | Baek et al. | 345/690 |
| 2005/0140906 | A1 * | 6/2005 | Baek | 349/144 |
| 2005/0162600 | A1 * | 7/2005 | Rho et al. | 349/139 |

FOREIGN PATENT DOCUMENTS

| | | |
|---|---|---|
| JP | 11-295717 | 10/1999 |
| JP | 2001-296523 | 10/2001 |
| JP | 2002-006303 | 1/2002 |

* cited by examiner

*Primary Examiner*—Mike Qi
(74) *Attorney, Agent, or Firm*—Cantor Colburn LLP

(57) ABSTRACT

A four color liquid crystal display (LCD) including red, green, blue, and white sub-pixels are provided. The LCD also includes a plurality of gate lines for transmitting gate signals to the sub-pixels and a plurality of data lines for transmitting data signals to the sub-pixels. The white sub-pixel is smaller than the other sub-pixels, and each of the data lines passes between adjacent two sub-pixels and includes at least one curved portion. Furthermore, the lengths of the data lines are substantially uniform.

12 Claims, 17 Drawing Sheets

| RP + | GP − | RP + | GP − |
|---|---|---|---|
| BP − | WP + | BP − | WP + |
| RP + | GP − | RP + | GP − |

Fig. 13

| | RP + | GP − | WP + | BP − | |
|---|---|---|---|---|---|
| GP + | WP − | BP + | RP − | | |
| | RP + | GP − | WP + | BP − | |

Fig. 14

| RP + | GP + | BP − | GP − |
|---|---|---|---|
| BP + | WP + | BP − | WP − |
| RP − | GP − | RP + | GP + |
| BP − | WP − | BP + | WP + |

Fig. 15

| RP + | GP + | WP + | BP + | RP − | GP − | WP − | BP − | BP + |
|---|---|---|---|---|---|---|---|---|
| GP − | WP + | BP + | RP + | GP + | WP − | BP − | RP − | GP − |
| | RP − | GP − | WP − | BP − | RP + | GP + | WP + | BP + | RP − |
| GP + | WP − | BP − | RP − | GP − | WP + | BP + | RP + | RP + |

LIQUID CRYSTAL DISPLAY HAVING PARTICULAR SUB-PIXELS

CROSS-REFERENCE TO RELATED APPLICATIONS

The present application claims priority from Korean Patent Application No. 10-2003-0055418, filed on Aug. 11, 2003, the disclosure of which is hereby incorporated herein by reference in its entirety.

(a) Field of the Invention

The present invention relates to a liquid crystal display.

(b) Description of Related Art

Generally, a liquid crystal display (LCD) includes a liquid crystal (LC) panel assembly including two panels provided with two kinds of field generating electrodes such as pixel electrodes and a common electrode and a LC layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCD includes a plurality of pixels including three sub-pixels, each sub-pixel including a pixel electrode and one of red, green and blue color filters. Hereinafter, a sub-pixel including red, green or blue color filter is referred to as a red sub-pixel, a green sub-pixel, or a blue sub-pixel, respectively. The sub-pixels are driven by signals applied thereto through display signal lines to perform display operation. The signal lines include gate lines for carrying the scanning signals and data lines for carrying data signals. Each sub-pixel has a thin film transistor (TFT) connected to one of the gate lines and one of the data lines to control the data signals applied to the pixel electrode.

Meanwhile, there are several types of arrangement of the red, green and blue sub-pixels. Examples are a striped arrangement where each sub-pixel column includes the sub-pixels representing the same color, a mosaic arrangement where the red, green and blue sub-pixels are arranged in turn along row and column directions, and a triad arrangement where the sub-pixels are arranged zigzag in the column direction and the red, green and blue sub-pixels are arranged in turn. The triad arrangement has an advantage in displaying a circle or an oblique line.

However, the conventional LCD representing one dot by the three color, red, green, and blue sub-pixels may involve poor optical efficiency since the color filters in the sub-pixels transmit only about one thirds of light incident thereupon. To improve optical efficiency, a four color LCD further including white sub-pixels without a color filter or additional sub-pixels representing a color other than red, green, and blue color has been developed. However, the conventional four color LCD may exhibit poor color concentration due to the added sub-pixel for high luminance.

SUMMARY OF THE INVENTION

A motivation of the present invention is to solve the problems of the conventional LCD.

A liquid crystal display is provided, which includes: a plurality of gate lines and a plurality of data lines intersecting each other; and a plurality of pixels connected to the gate lines and the data lines, each pixel including red, green, blue, and white sub-pixels, wherein the white sub-pixel is smaller than the red, green, and blue sub-pixels, each data line passes between two sub-pixels and has at least a curve portion, and the length of the data lines is substantially uniform.

The sub-pixels may have substantially an equal length, the white sub-pixel may have a width smaller than the widths of the red, blue, and green sub-pixels, the sub-pixels may be arranged to form a plurality of rows, the sub-pixels in each row may be arranged in turn, and sub-pixel arrangements in adjacent rows may be shifted by a predetermined number of sub-pixels.

Each row may include red, green, white, and blue sub-pixels sequentially arranged in a first direction, the red and white sub-pixels may be adjacent in a second direction, and a straight line extending in the second direction and passing through a center of the red sub-pixel may pass through a center of the white sub-pixel.

Each pixel may include a red sub-pixel, a white sub-pixel adjacent to the red sub-pixel in the second direction, and green and blue sub-pixels adjacent to the white sub-pixel in the first direction. Alternatively, each pixel may include a red sub-pixel, a green sub-pixel adjacent to the red sub-pixel in the first direction, and white and blue sub-pixels adjacent to the red and green sub-pixels in the second direction, respectively.

The sub-pixels may be subjected to 1×1 line inversion or 1×1 dot inversion.

Sub-pixel arrangements in adjacent rows may be shifted by two sub-pixels.

The liquid crystal display may be subjected to sub-pixel rendering.

The sub-pixels may be arranged to form a plurality of rows, the sub-pixels in each row may be arranged in turn, and sub-pixel arrangements in adjacent rows may be shifted by a predetermined number of sub-pixels.

A logical pixel for the sub-pixel rendering may include red and green sub-pixels in a first row, and white and blue sub-pixels that belong to a second row adjacent to the first row and are adjacent to the red and green sub-pixels, respectively. Alternatively, a logical pixel for the sub-pixel rendering may include a red sub-pixel in a first row, a white sub-pixel that belongs to a second row adjacent to the first row and is disposed adjacent to the red sub-pixel, and green and blue sub-pixels that belong to the second row and are disposed adjacent to the white sub-pixel.

A liquid crystal display is provided, which includes: a plurality of gate lines formed on a substrate and extending in a first direction; a gate insulating layer formed on the gate lines; a semiconductor layer formed on the gate insulating layer; a plurality of data lines formed at least on the semiconductor layer and extending in a second direction; a plurality of drain electrodes formed at least on the semiconductor layer and separated from the data; and a plurality of first and second pixel electrodes connected to the drain electrodes and arranged in a plurality of rows, wherein width of the second electrodes is smaller than width of the first electrodes, the first and the second pixel electrodes are adjacent in the second direction, the first and second pixel electrodes adjacent to each other have boundaries that extend in the second direction and do not coincide with each other, a straight line that extends in the second direction and passes through centers of the first pixel electrodes passes through centers of the second pixel electrodes adjacent to the first pixel electrodes, and the data lines extend along the boundaries of the first and second pixel electrodes.

The liquid crystal display may include red, green, blue, and white sub-pixels, and the red, green, and blue sub-pixels may include the first pixel electrodes, while the white sub-pixels comprise the second pixel electrodes.

The data lines may intersect the gate lines and may have curved portions running in the first direction at the vicinity of the intersections, and the curved portions of the data lines may be spaced apart form the gate lines.

The lengths of the data lines or the lengths of portions of the data lines adjacent to the first and the second pixel electrodes may be substantially uniform. Signal delays in the data lines may be substantially uniform.

BRIEF DESCRIPTION OF THE DRAWINGS

The present invention will become more apparent by describing embodiments thereof in detail with reference to the accompanying drawing in which:

FIG. 12 illustrates an example of a polarity distribution of sub-pixels of an LCD having the mosaic arrangements shown in FIGS. 3A and 3B and performing 1×1 dot inversion;

FIG. 13 illustrates an example of a polarity distribution of sub-pixels of an LCD having the delta arrangement shown in FIG. 4A and performing 1×1 dot inversion;

FIG. 14 illustrates an example of a polarity distribution of mosaicked sub-pixels 2×2 dot inversion; and FIG. 15 illustrates an example of a polarity distribution of sub-pixels of an LCD having the delta arrangement and performing 2×4 dot inversion.

DETAILED DESCRIPTION OF PREFERRED EMBODIMENTS

Figure 1:
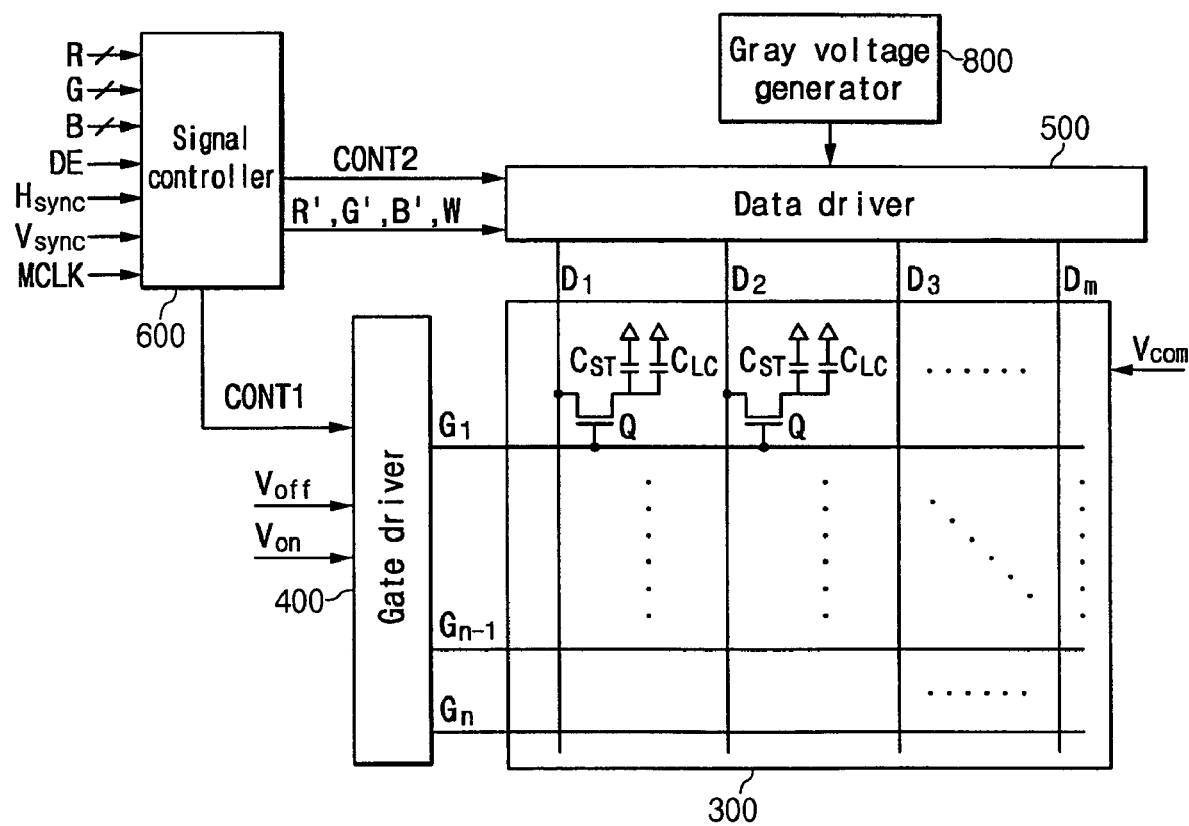
FIG. 1 is a block diagram of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, four color liquid crystal displays according to embodiments of the present invention will be described with reference to the accompanying drawings.

Figure 2:
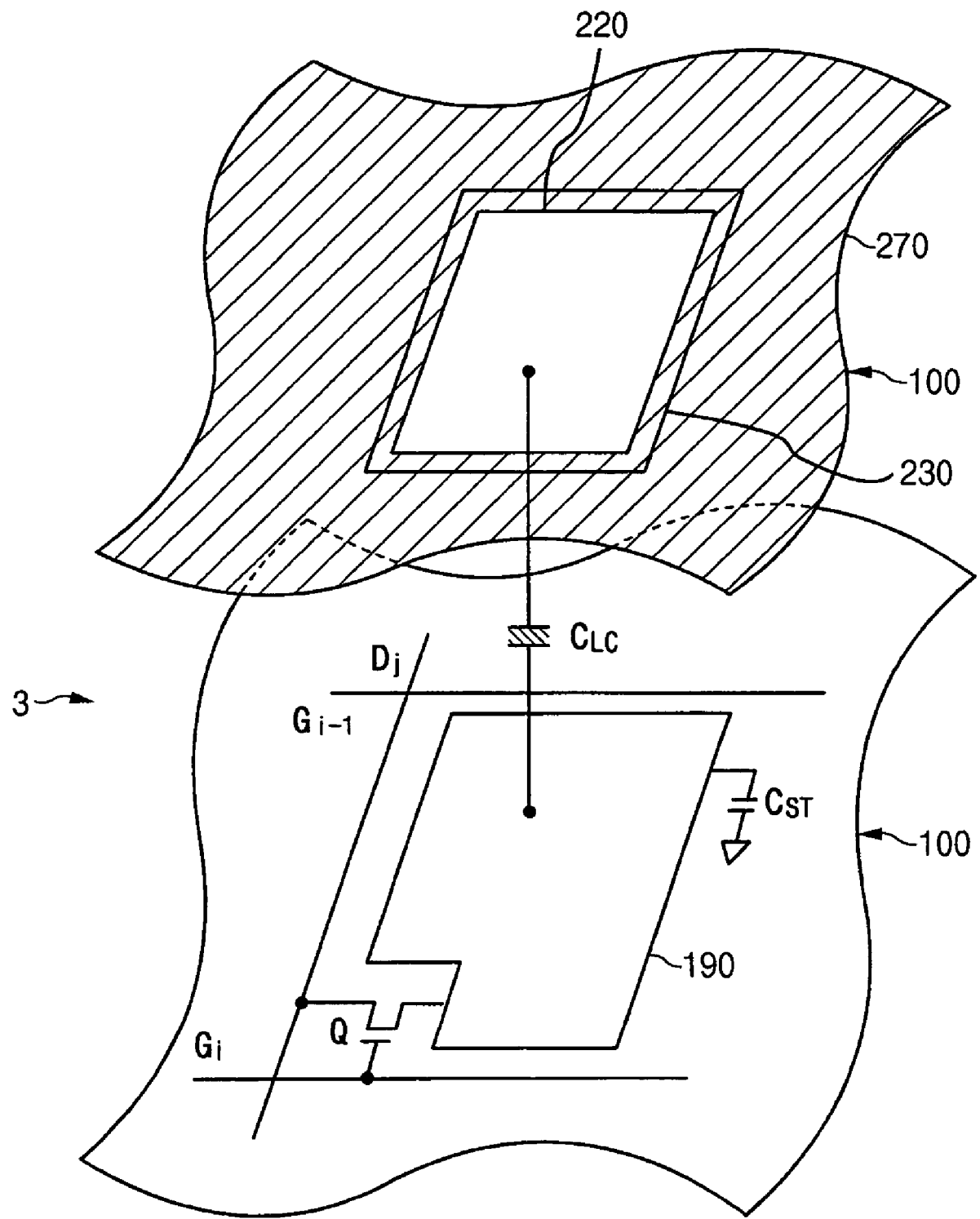
FIG. 2 is an equivalent circuit diagram of a sub-pixel of an LCD according to an embodiment of the present invention.

Referring to FIGS. 1 and 2, a four color LCD according to an embodiment of the present invention will be described.

FIG. 1 is a block diagram of an LCD according to an embodiment of the present invention and FIG. 2 is an equivalent circuit diagram of a sub-pixel of an LCD according to an embodiment of the present invention.

Referring to FIG. 1, an LCD according to an embodiment of the present invention includes a LC panel assembly 300, a gate driver 400 and a data driver 500 that are connected to the panel assembly 300, a gray voltage generator 800 connected to the data driver 500, and a signal controller 600 controlling the above elements.

Referring to FIG. 2, the panel assembly 300 includes a lower panel 100, an upper panel 200, and a LC layer 3 interposed therebetween, while it includes, in a circuital view, a plurality of display signal lines $G_1$-$G_n$ and $D_1$-$D_m$ and a plurality of sub-pixels connected thereto and arranged substantially in a matrix.

The display signal lines $G_1$-$G_n$ and $D_1$-$D_m$ are provided on the lower panel 100 and include a plurality of gate lines $G_1$-$G_n$ transmitting gate signals (also referred to as "scanning signals"), and a plurality of data lines $D_1$-$D_m$ transmitting data signals. The gate lines $G_1$-$G_n$ extend substantially in a row direction and they are substantially parallel to each other, while the data lines $D_1$-$D_m$ extend substantially in a column direction and they are substantially parallel to each other.

Each sub-pixel includes a switching element Q connected to the signal lines $G_1$-$G_n$ and $D_1$-$D_m$, and an LC capacitor $C_{LC}$ and a storage capacitor $C_{ST}$ that are connected to the switching element Q. If unnecessary, the storage capacitor $C_{ST}$ may be omitted.

The switching element Q is provided on the lower panel 100 and has three terminals: a control terminal connected to one of the gate lines $G_1$-$G_n$; an input terminal connected to one of the data lines $D_1$-$D_m$; and an output terminal connected to both the LC capacitor $C_{LC}$ and the storage capacitor $C_{ST}$.

The LC capacitor $C_{LC}$ includes a pixel electrode 190 provided on the lower panel 100 and a common electrode 270 provided on the upper panel 200 as two terminals. The LC layer 3 disposed between the two electrodes 190 and 270 functions as dielectric of the LC capacitor $C_{LC}$. The pixel electrode 190 is connected to the switching element Q, and the common electrode 270 is connected to the common voltage Vcom and covers entire surface of the upper panel 200. Unlike FIG. 2, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each sub-pixel can represent its own color by providing one of a plurality of red, green, blue color filters and transparent filters 230 in an area corresponding to the pixel electrode 190. The color filter 230 shown in FIG. 2 is provided on the upper panel 200. However, the transparent filters may be omitted.

The upper panel 200 further includes a light blocking member 220 (that is indicated by hatched area and also referred to as a black matrix) for preventing light leakage and the light blocking member 220 has open areas facing the pixel electrodes 190 or the color filters 230.

The color filters 230 may be disposed on or under the pixel electrode 190 of the lower panel 100, and the light blocking member 200 may be omitted or disposed on the lower panel 100.

A polarizer or polarizers (not shown) are attached to at least one of the panels 100 and 200.

A spatial arrangement of the sub-pixels will be described with reference to FIGS. 3A-4C.

Figure 3A:
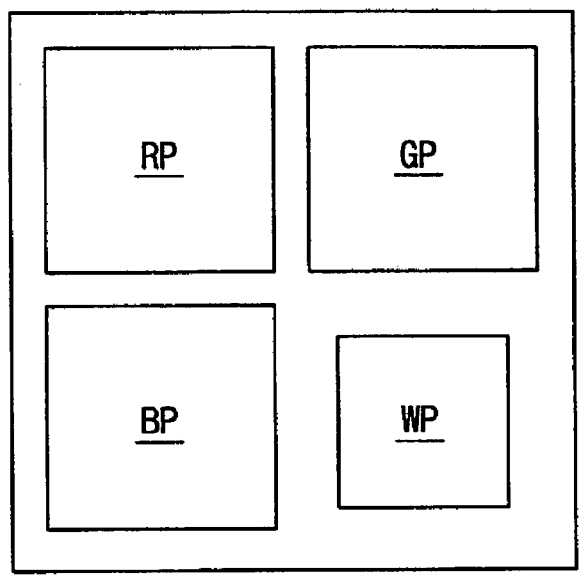
FIGS. 3A and 3B illustrate spatial arrangements of sub-pixels of LCDs according to embodiment of the present invention.
Figure 3B:
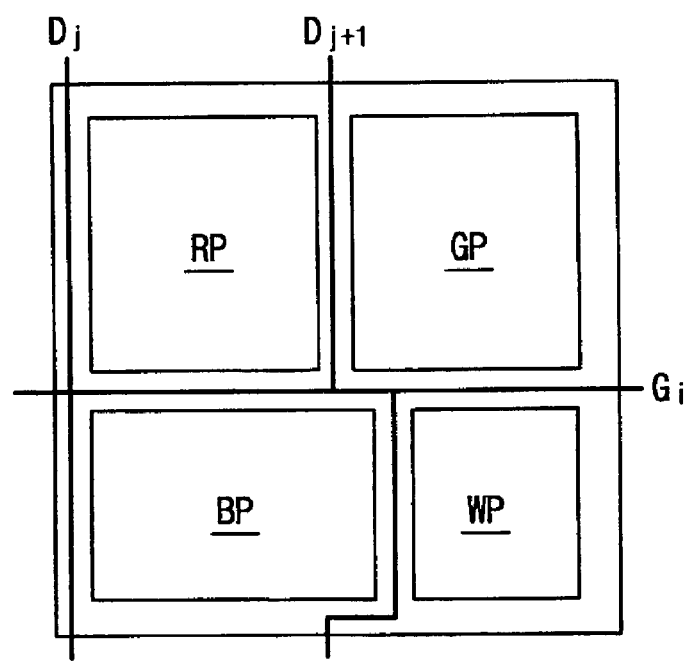

FIGS. 3A and 3B illustrate examples of a spatial arrangement of sub-pixels of a four color LCD according to embodiments of the present invention.

Referring to FIGS. 3A and 3B, a pixel includes a red sub-pixel RP, a green sub-pixel GP, a blue sub-pixel BP, and a white sub-pixel WP, which are arranged in a 2×2 matrix, and thus the arrangement shown in FIGS. 3A and 3B is referred to as a mosaic arrangement. The red and green sub-pixels RP and GP form a row and the blue and white sub-pixels form the other row, while the red and blue sub-pixels RP and BP form a column and the green and white sub-pixels form another row. The white sub-pixel WP is smaller than the other sub-pixels RP, GP, and BP, and for example, the area of the white sub-pixel WP is equal to or less than about 50% of that of another sub-pixel RP, GP, or BP.

In FIG. 3A, a pixel area is quartered into equal quarters and the quarters are assigned to the respective sub-pixels RP, GP, BP and WP. To prevent the light leakage near the white pixel WP, the widths of the data lines $D_1$-$D_m$ and the gate lines $G_1$-$G_n$ may be enlarged near the white sub-pixel WP or the opening of the light blocking member 220 facing the white sub-pixel WP is decreased. At this time, one mask needs for making the red, green, and blue color filters.

In FIG. 3B, a pixel area is quartered into three larger sub-areas assigned to the red, green and blue sub-pixels RP, GP and BP and a smaller sub-area assigned to the white sub-pixel WP. The red and green sub-pixels RP and GP in the upper row are elongated downward, while the blue sub-pixel BP in the lower row is elongated to right. Accordingly, since right boundary lines of the red sub-pixel and the blue sub-pixel are inconsistent, the data line $D_{j+1}$ passing through a pixel is curved. However, the data line $D_j$ running between the pixels is straight. In this case, the sizes of the sub-pixels RP and GP are equal to each other, but they are different from those of the blue and white sub-pixels BP and WP. Therefore, the number of masks required for forming the color filters 230 is three.

Since the sub-pixel WP is decreased and the other sub-pixels RP, BP, and GP are increased within a given area, color concentration is improved with maintaining the brightness increase generated by adding the white sub-pixel WP.

Figure 4A:
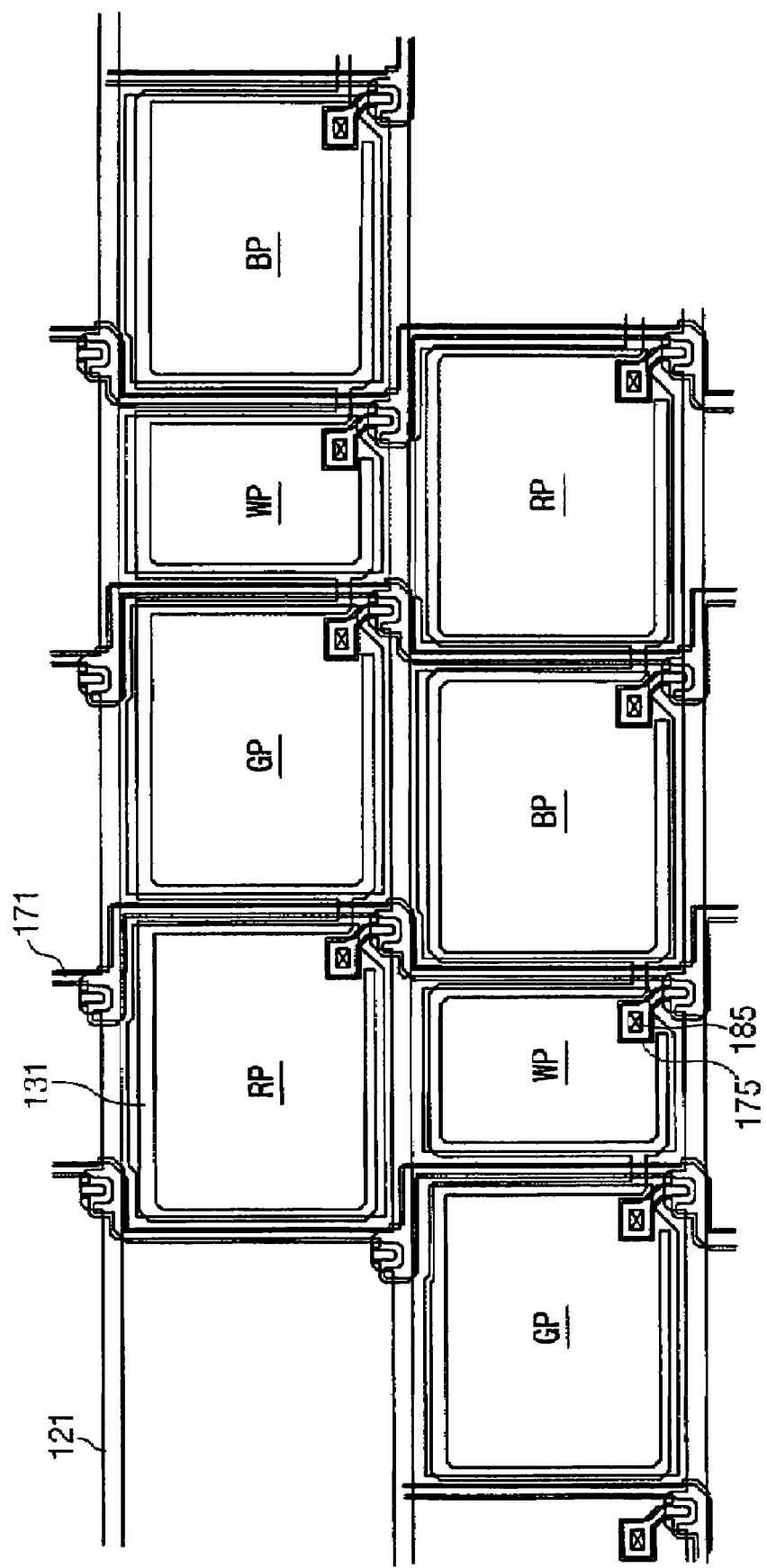
FIGS. 4A-4C illustrate a spatial arrangement and basic pixel configurations of LCDs according to other embodiments of the present invention.
Figure 4B:
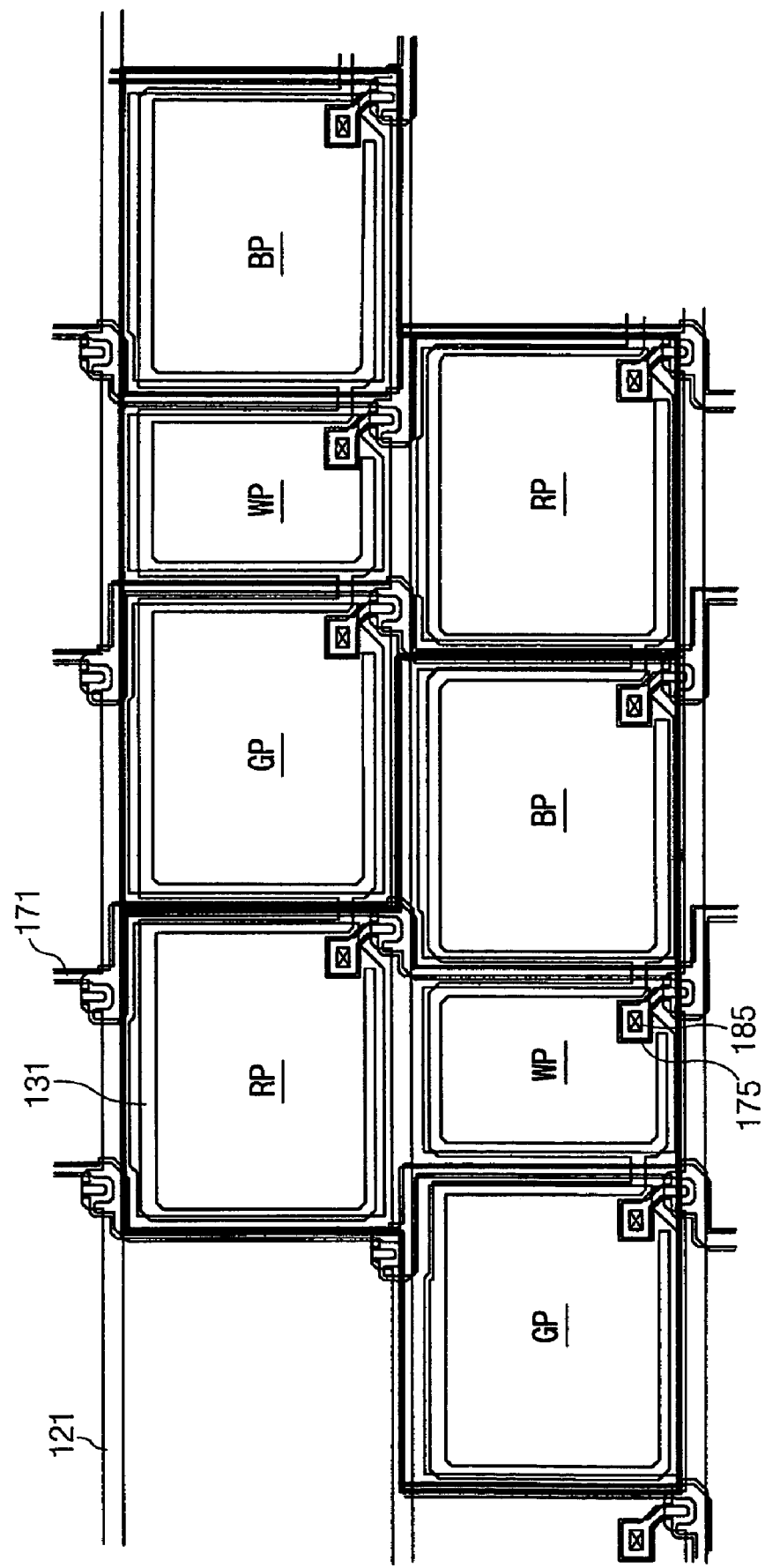
Figure 4C:
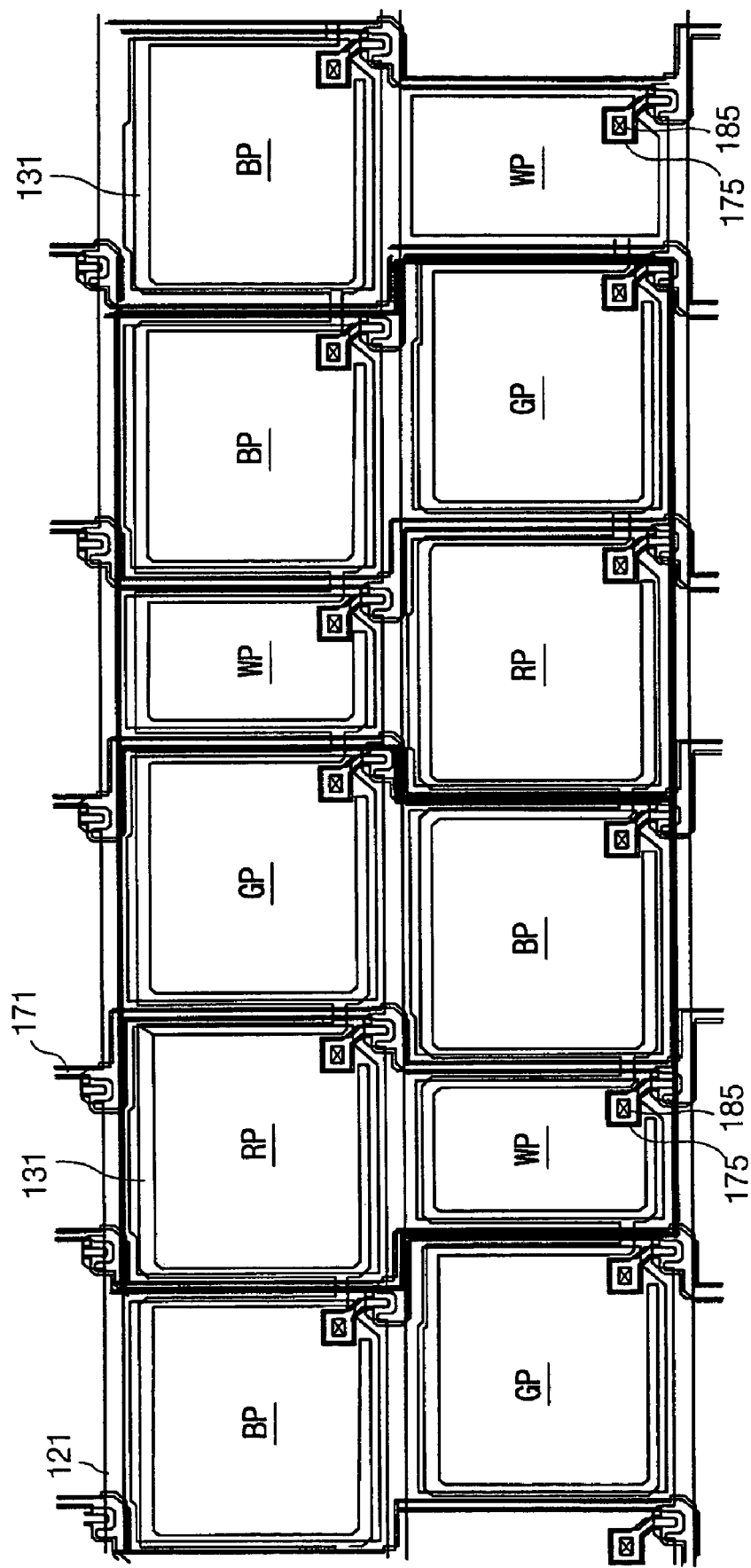

FIGS. 4A-4C illustrate a spatial arrangement of sub-pixels and basic pixel configurations of an LCD according to other embodiments of the present invention.

As shown in FIG. 4A, the sub-pixels RP, GP, WP, and BP are arranged in turn in a row direction. The sizes of the sub-pixels RP, GP, and BP are equal to each other, while the sub-pixel WP is smaller than the other sub-pixels RP, GP and BP. The longitudinal length of the sub-pixels RP, GP, BP, and WI) are substantially equal to each other, while the transverse width of the sub-pixel WP is smaller than the widths of the other sub-pixels RP, GP, and BP. A longitudinal line passing through a center of the sub-pixel RP in a row also passes through a center of the white sub-pixel WP in an adjacent row. As a result, a sub-pixel arrangement of a row is the same as that of an adjacent row shifted by about two sub-pixels to the right or left.

Since the center lines of the two sub-pixels RP and WV) adjacent in a column direction coincide with each other in an example shown in FIG. 4A, the distance between the left boundaries of the sub-pixels RP and WP are equal to that between their right boundaries. Therefore, two data lines $D_j$ and $D_{j+1}$ passing adjacent to the left and right boundaries, respectively, have an equal length and thus the signal delay in the data lines $D_j$ and $D_{j+1}$ is substantially equal to each other. Accordingly, the data lines $D_j$ and $D_{j+1}$ transmit relatively uniform data signals as compared with those shown in FIG. 3B.

Referring to FIG. 4B, one pixel includes a red sub-pixel RP, a white sub-pixel WP adjacent thereto in a column direction, and green and blue sub-pixels GP and BP adjacent thereto in the row direction. Accordingly, a pixel has a shape of a triangle or a reversed-triangle and such a sub-pixel arrangement may be called a triangular or delta (Δ) arrangement. In the delta arrangement, the triangular pixel and the reversed-triangular pixel are arranged in turn along the row direction.

Referring to FIG. 4C, one pixel includes a pair of red and green sub-pixels RP and GP adjacent to each other in the row direction and a pair of white and blue sub-pixels WP and BP adjacent to the pair of red and green sub-pixels RP and GP in the column direction. In this case, a pixel has a shape of a trapezoid or a reversed-trapezoid similar to a rectangle.

Examples of the representation of a letter by various LCDs will be described with reference to FIGS. 5-7B.

Figure 5:
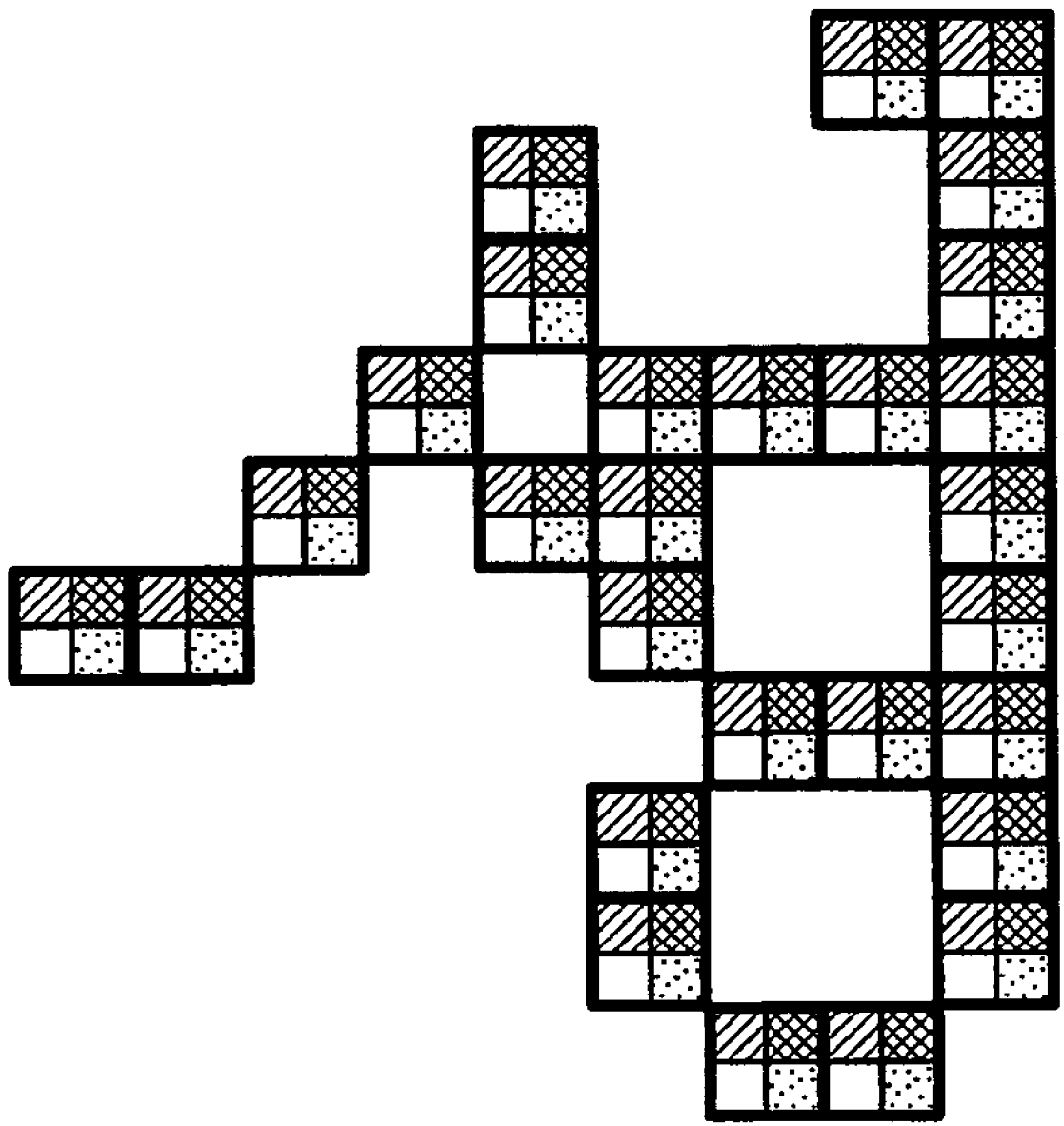
FIG. 5 is an expanded view of a Korean letter "섬" displayed in a four color LCD having the mosaic arrangements shown in FIGS. 3A and 3B.
Figure 6A:
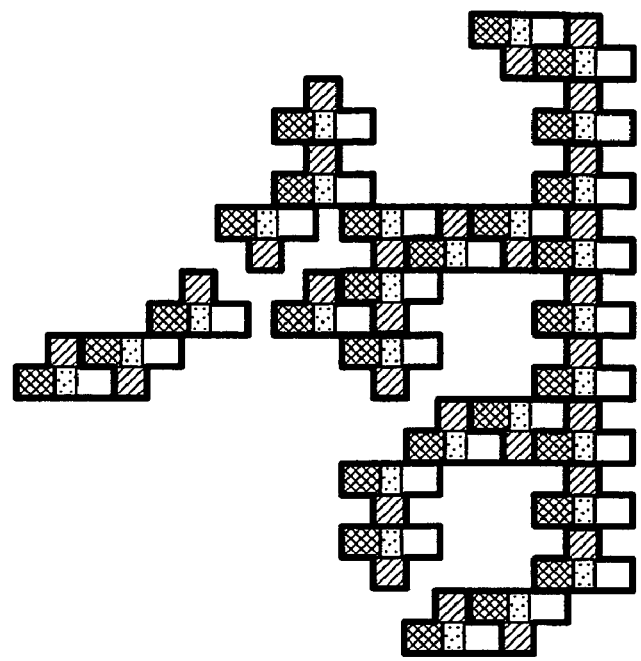
FIGS. 6A and 6B are expanded views of a Korean letter "섬" displayed in a four color LCD of having the delta arrangement shown in FIG. 4B.
Figure 6A:
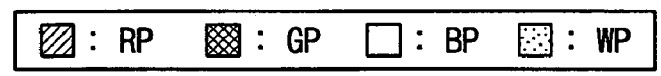
Figure 6B:
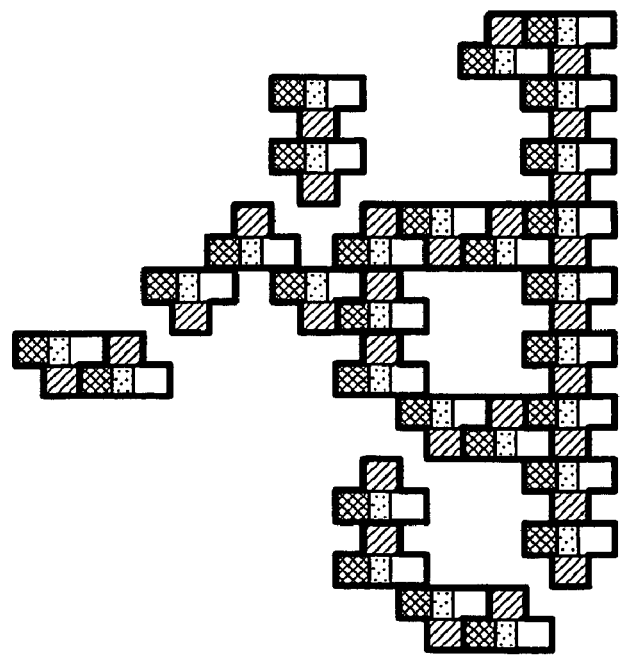
Figure 6B:
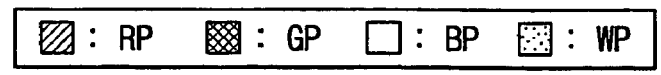
Figure 7A:
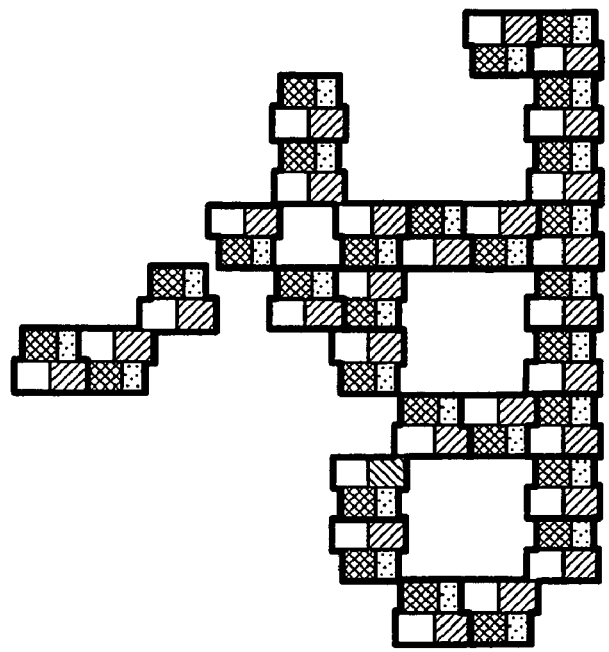
FIGS. 7A and 7B are expanded views of a Korean letter "섬" displayed in a four color LCD having the delta arrangement shown in FIG. 4C.
Figure 7B:
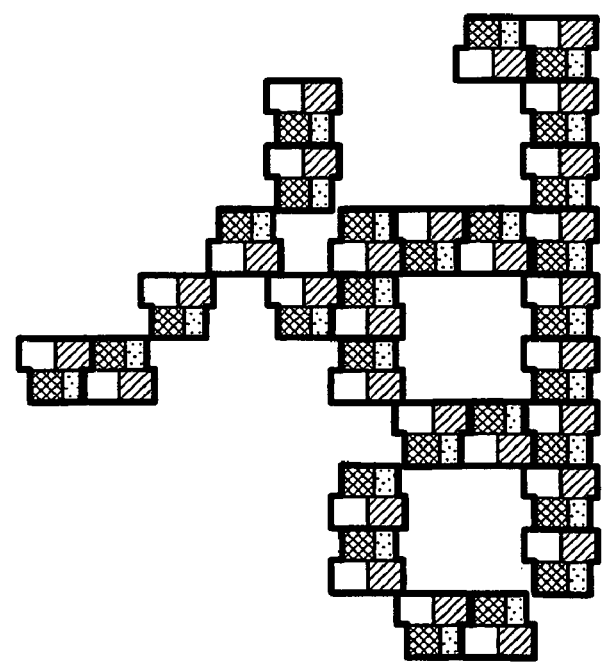

FIGS. 5 to 7B are expanded view of a Korean letter "설" displayed in four color LCDs according to embodiments of the present invention. In detail, FIG. 5 is that represented by the sub-pixels in the mosaic arrangement shown in FIGS. 3A and 3B, FIG. 6A is that by the sub-pixels in the delta arrangement shown in FIG. 4B, and FIG. 7A is that represented by the sub-pixels in the delta arrangement shown in FIG. 4C. Furthermore, FIGS. 6B and 7B are those shown in FIGS. 6A and 7A shifted by one pixel in the right direction.

The mosaic arrangement shown in FIG. 5 is preferable for representing a transverse or longitudinal straight line since all pixels have a shape of a regular square.

Meanwhile, in the delta arrangement shown in FIGS. 6A and 6B gives a relatively poor representation of a transverse or longitudinal straight line since the length and the width of a pixel is different from each other such that the width of the longitudinal line is different from that of the transverse line. However, the length and the width of each pixel may be made equal to each other, and in this case, the resolution in the row direction may be increased when the number of rows is fixed. Since the pixels adjacent in an oblique direction partially overlapping each other, the continuity in the oblique direction is guaranteed in some degree. For this reason, the delta arrangement is preferable for representing an oblique line and further a curve. However, since the length of an upper edge of the pixel is greatly different from the length of a lower edge thereof and shapes of two pixels adjacent in the row direction are reversed, when the letter is displayed after shifted by one pixel, the outline of the letter after shift may be different from that before shift as shown in FIGS. 6A and 6B.

The delta arrangements shown in FIGS. 7A and 7B show good representations of a longitudinal or transverse line, although the length of an upper edge of a pixel is different from the length of a lower edge thereof, the difference between the lengths is small such that a shape of the pixel is close to a square. In addition, since the pixels adjacent in an oblique line partly overlap each other, the delta arrangement is suitable for representing an oblique line and a curve. Furthermore, although the shapes of two pixels adjacent in the row direction are reversed, the shape of a letter after shifted by a pixel is similar to that before shift since the difference in the length between the upper edge and the lower edge of a pixel is small.

In the meantime, sub-pixel rendering is applied to the above-described sub-pixel arrangement in order to improve the resolution of the LCD, which will be described in detail with reference to FIGS. 8A to 8C.

Figure 8A:
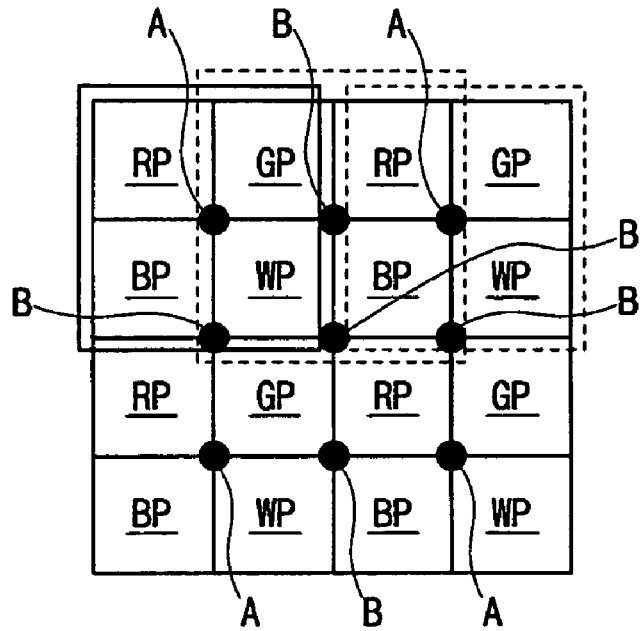
FIG. 8A illustrates basic pixels and logical pixels for rendering according to a four color LCD having the mosaic arrangement shown in FIGS. 3A and 3B.
Figure 8B:
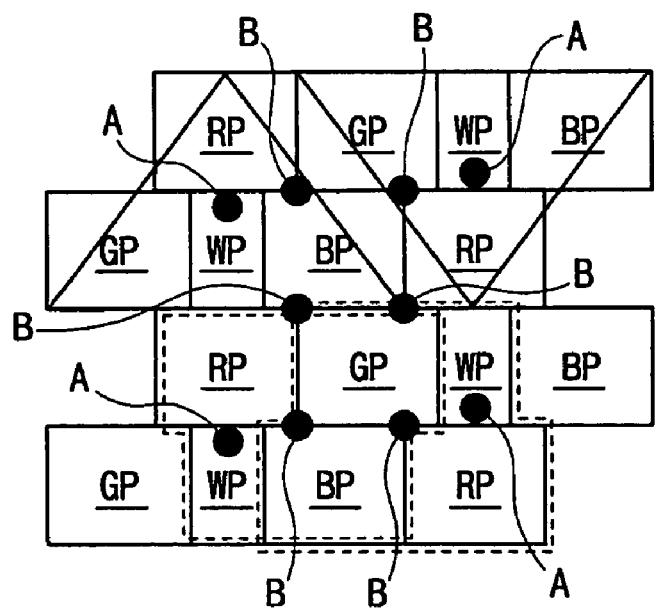
FIG. 8B illustrates basic pixels and logical pixels for rendering according to a four color LCD having the delta arrangement shown in FIG. 4B.
Figure 8C:
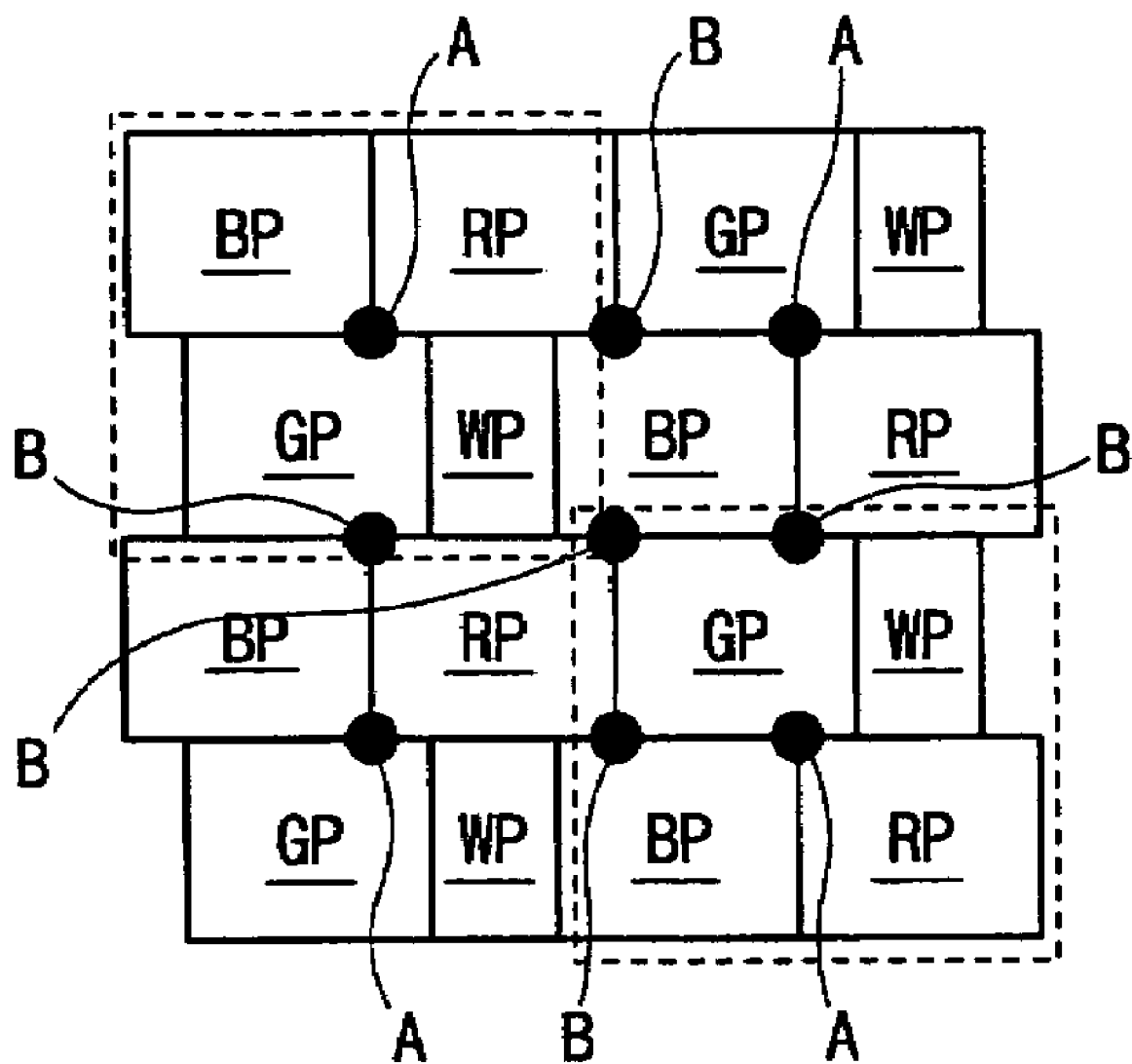
FIG. 8C illustrates basic pixels and logical pixels for rendering according to a four color LCD having the delta arrangement shown in FIG. 4C.

FIG. 8A illustrates basic pixels and logical pixels for rendering in the four color LCD with the mosaic arrangement shown in FIG. 3A or 3B, FIG. 8B illustrates basic pixels and logical pixels for rendering in the four color LCD with the delta arrangement shown in FIG. 4B, and FIG. 8C illustrates basic pixels and logical pixels for rendering in the four color LCD of the delta arrangement shown in FIG. 4C.

Referring to FIG. 8A, the rendering is performed based on a logical pixel unit including sub-pixels arranged in a 2×2 matrix. For rendering, the logical pixels are obtained by shifting sub-pixel by sub-pixel in row and column directions and then one sub-pixel belongs to four logical pixels. As shown in FIG. 8A, additional five logical pixels are obtained for given four basic pixels and thus the total number of the logical pixels is nine.

The logical pixels shown in FIG. 8B include two types shown in FIG. 4B and shown in FIG. 4C, respectively. Since a sub-pixel belongs to five logical pixels and additional six logical pixels are made for given four basic pixels, the total number of logical pixels is ten.

Referring to FIG. 8C, a logical pixel is defined as a pixel shown in FIG. 4C. That is, a logical pixel includes a pair of two sub-pixels adjacent in a row direction and including no white sub-pixel and another pair of sub-pixels adjacent thereto in a column direction and including a white sub-pixel. In this case, a sub-pixel belongs to four logical pixels and additional five logical pixels are obtained for given four basic pixels. As a result, the total number of the logical pixels is nine.

In FIGS. 8A to 8C, the centers of the logical pixels are indicated as "A" and the centers of the additional logical pixels are indicated as "B."

The configuration shown in FIG. 8A is suitable for displaying texts such as characters since the centers A and B of the basic pixels and the logical pixels maintain uniform distance and they are aligned in transverse or longitudinal straight lines.

On the contrary, the configuration shown in FIG. 8B is appropriate for displaying motion images and advantageously employed to a large screen since a lot of the additional logical pixels are generated. However, although the centers A of the triangular basic pixels are not disposed on the boundaries between pixel rows, the centers B of the additional logical pixels are disposed on the boundaries. Therefore, the centers A and B are not disposed on transverse or longitudinal straight lines. In addition, the centers A and B do not maintain uniform distance, and furthermore, the centers A deviate upward and downward from the boundaries between the pixel rows.

Referring to FIG. 8C, even though four sub-pixels BP, RP, GP, and WP are arranged in the delta arrangement, the basic pixels and the logical pixels have the same shape and the centers A and B thereof are disposed on the boundaries of the pixel rows. Hence, the centers A and B are aligned in transverse or longitudinal straight lines and maintain a uniform distance. Accordingly, the configuration shown in FIG. 8C is appropriate for displaying texts and gives uniform distribution of image quality.

As a result, the four color LCD having the delta arrangement selects a triangular (or reversed-triangular) basic pixel or a trapezoidal (or reversed-triangular basic pixel) depending on the image type to be displayed.

The arrangements of the four pixels shown in FIGS. 3A, 3B, 4A, and 4B are only examples thereof and they may be modified.

An example of a detailed structure of a TFT array panel for an LCD having the sub-pixel arrangement shown in FIG. 4A according to an embodiment of the present invention will be described with reference to FIGS. 9 and 10A to 10C.

Figure 9:
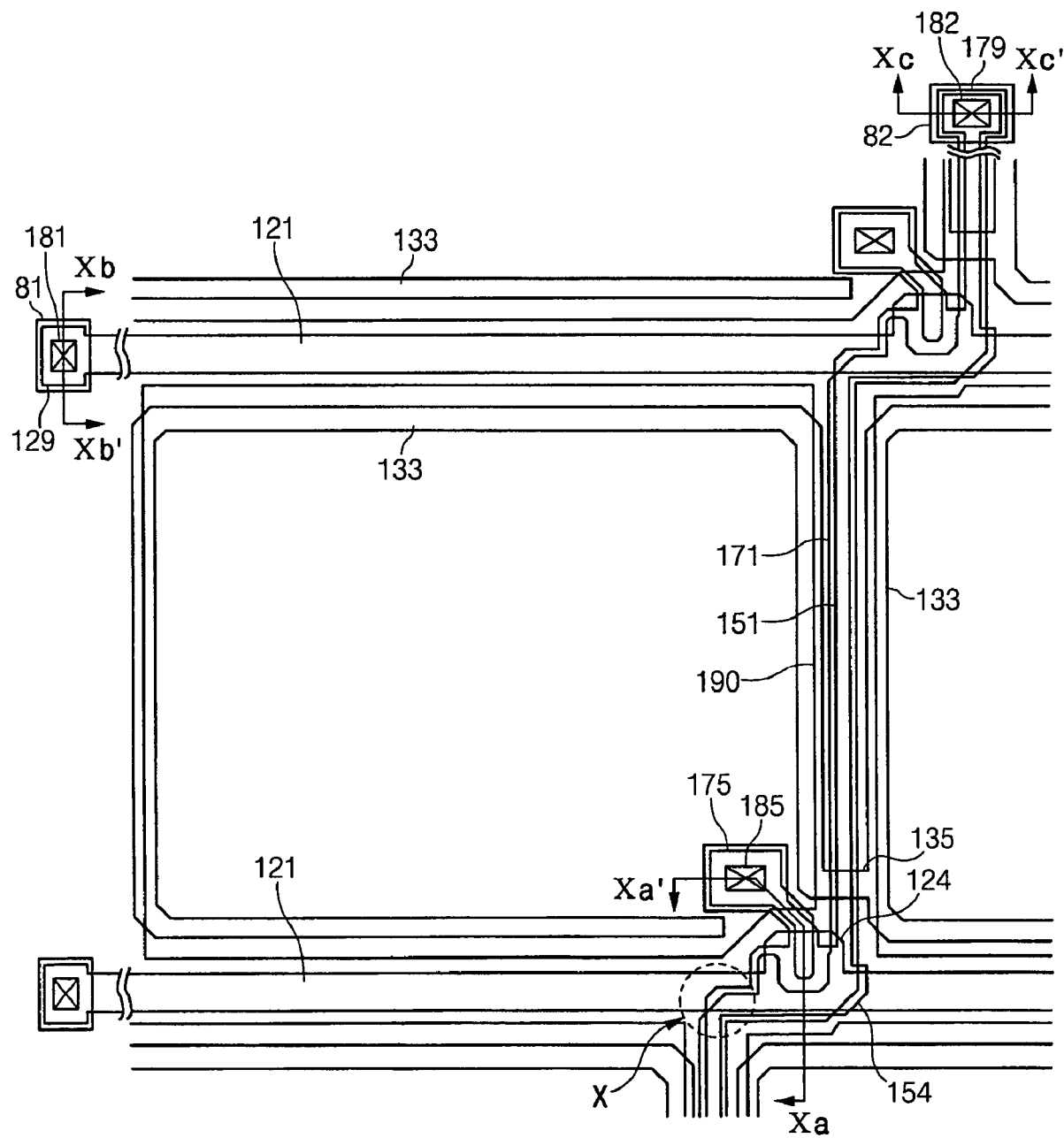
FIG. 9 is a layout view of an exemplary TFT array panel for an LCD according to an embodiment of the present invention.
Figure 10A:
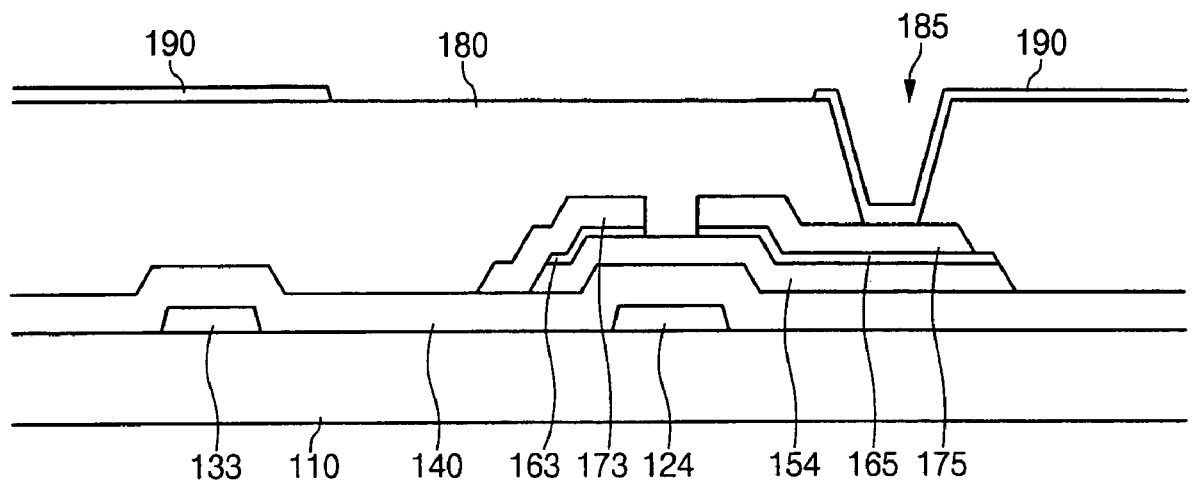
FIGS. 10A to 10C are sectional views of the TFT array panel shown in FIG. 9 taken along the lines Xa-Xa', Xb-Xb', and Xc-Xc', respectively.
Figure 10B:
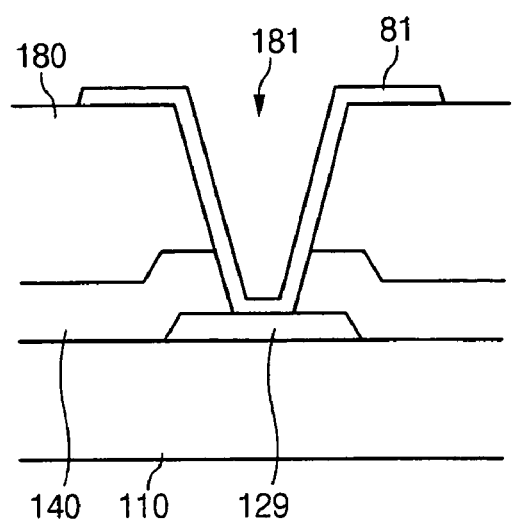
Figure 10C:
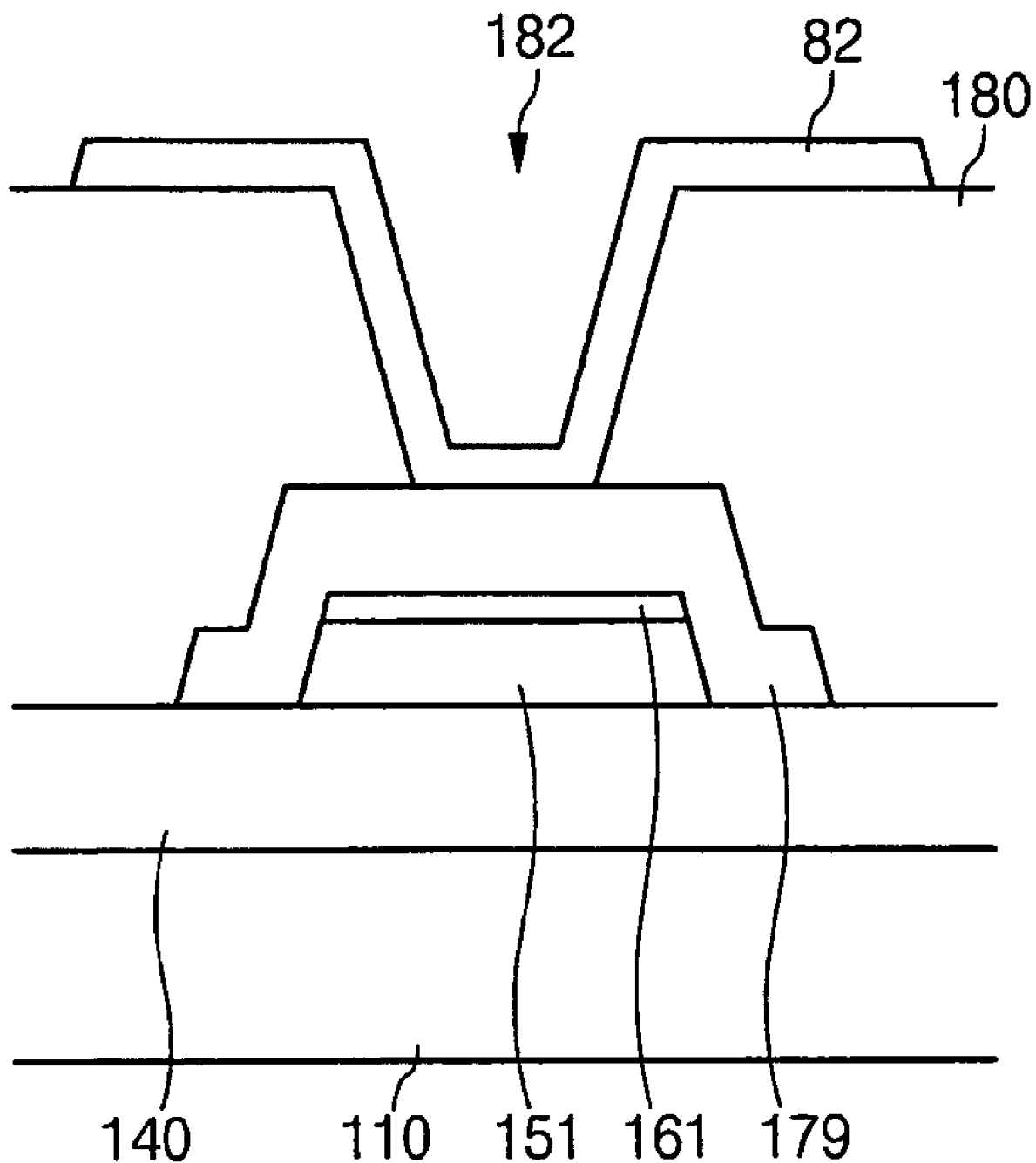

FIG. 9 is a layout view of an exemplary TFT array panel for an LCD according to an embodiment of the present invention and FIGS. 10A to 10C are sectional views of the TFT array panel shown in FIG. 9 taken along the lines Xa-Xa', Xb-Xb', and Xc-Xc', respectively.

A plurality of gate lines 121 and a plurality of storage electrodes 133 are formed on an insulating substrate 110.

Each gate line 121 for transmitting gate signals extends substantially in a transverse direction and a plurality of portions of each gate line 121 projecting upward form a plurality of gate electrodes 123.

Each storage electrode 133 is separated from the gate lines 121 and supplied with a predetermined voltage such as the common voltage supplied to a common electrode 270 of the other panel 200 shown in FIG. 2. The storage electrode 133 has a shape of a rectangular ring and includes a connection 135 connected to an adjacent storage electrode 133.

The gate lines 121 and the storage electrodes 133 include a low resistivity conductive layer preferably made of Ag containing metal such as Ag and Ag alloy or Al containing metal such as Al and Al alloy or another metal layer preferably made of Cr, Ti, Ta, Mo or their alloys such as MoW alloy. The gate lines 121 and the storage electrodes 133 may have a multi-layered structure including a low resistivity conductive layer and another layer preferably made of Cr, Ti, Ta, Mo or their alloys such as MoW alloy having good physical, chemical and electrical contact characteristics with other materials such as indium tin oxide (ITO) and indium zinc oxide (IZO). A good exemplary combination of such layers is Cr and Al—Nd alloy.

The lateral sides of the gate lines 121 and the storage electrodes 133 are inclined to a surface of the substrate 110, and the inclination angle thereof preferably ranges about 30-80 degrees.

A gate insulating layer 140 preferably made of silicon nitride (SiNx) is formed on the gate lines 121 and the storage electrodes 133.

A plurality of semiconductor stripes 151 preferably made of hydrogenated amorphous silicon (abbreviated to "a-Si") are formed on the gate insulating layer 140. Each semiconductor stripe 151 includes a plurality of projections 154 widely overlapping the gate electrodes 124.

A plurality of ohmic contacts 161 and 165 preferably made of silicide or n+ hydrogenated a-Si heavily doped with n type impurity are formed on the semiconductor stripes 151. The ohmic contacts 161 have a plurality of projections 163 and the projections 163 and the ohmic contacts 165 are located in pairs on the projections 154 of the semiconductor stripes 151.

The lateral sides of the semiconductor stripes 151 and the ohmic contacts 161 and 165 are also inclined with respect to the surface of the substrate 110, and the inclination angles thereof are preferably in a range of about 30-80 degrees.

A plurality of data lines 171 and a plurality of drain electrodes 175 are formed on the ohmic contacts 161 and 165 and the gate insulating layer 140.

The data lines 171 for transmitting data voltages extend substantially in the longitudinal direction and they run shortly in the transverse direction near the gate lines 121 and intersect the gate lines 121.

A plurality of branches of each data line 171, which extend toward the drain electrodes 175, form a plurality of source electrodes 173. Each pair of the source electrodes 173 and the drain electrodes 175 are separated from each other and opposite each other with respect to a gate electrode 123. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of a refractory metal such as Cr, Ta, Ti, Mo or their alloys. The data lines 171 and the drain electrodes 175 may have a multilayered structure including a low resistivity conductive layer preferably made of Al containing metal or Ag containing metal and another layer preferably made of Cr, Ti, Ta, Mo or their alloys having good physical, chemical and electrical contact characteristics with other materials such as ITO and IZO.

The lateral sides of the data lines 171 and the drain electrodes 175 are also inclined with respect to the surface of the substrate 110, and the inclination angle thereof ranges about 30-80 degrees.

The ohmic contacts 161 and 165 interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor stripes 154. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride. Alternatively, the passivation layer 180 may includes both a silicon nitride film and an organic film.

The passivation layer 180 has a plurality of contact holes 182 and 185 exposing end portions 179 of the data lines 171 and the drain electrodes 175, respectively. The passivation layer 180 and the gate insulating layer 140 has a plurality of contact holes 181 exposing end portions 129 of the gate lines 121.

A plurality of pixel electrodes 190 and a plurality of contact assistants 81 and 82, which are preferably made of IZO or ITO, are formed on the passivation layer 180.

The pixel electrodes 190 are physically and electrically connected to the drain electrodes 175 through the contact holes 185 and receive the data voltages from the drain electrodes 175.

Referring back to FIG. 2, the pixel electrodes 190 supplied with the data voltages generate electric fields in cooperation with the common electrode 270 on the other panel 200, which reorient LC molecules in the LC layer 3 disposed therebetween.

As described above, a pixel electrode 190 and a common electrode 270 form a LC capacitor $C_{LC}$, which stores applied voltages after turn-off of the TFT Q. Referring to FIG. 9, the pixel electrode 190 overlaps a storage electrode 133 around its edges to form a storage capacitor, which is connected in parallel to the LC capacitor $C_{LC}$ for enhancing the voltage storing capacity.

The pixel electrodes 190 may overlap the gate lines 121 and the data lines 171 to increase aperture ratio.

The contact assistants 81 and 82 are connected to the exposed end portions 129 of the gate lines 121 and the exposed end portions 179 of the data lines 171 through the contact holes 181 and 189, respectively. The contact assistants 81 and 82 protect the exposed portions 129 and 179 and complement the adhesion between the exposed portion 129 and 179 and external devices, but they are optional.

According to another embodiment of the present invention, the pixel electrodes 190 are made of transparent conductive polymer. For a reflective or transflective LCD, the pixel electrodes 190 include opaque reflective metal. In this case, the contact assistants 81 and 82 may be made of a material different from the pixel electrodes 190, such as ITO or IZO.

An exemplary detailed structure of a TFT array panel for an LCD according to another embodiment of the present invention will be described with reference to FIG. 11.

Figure 11:
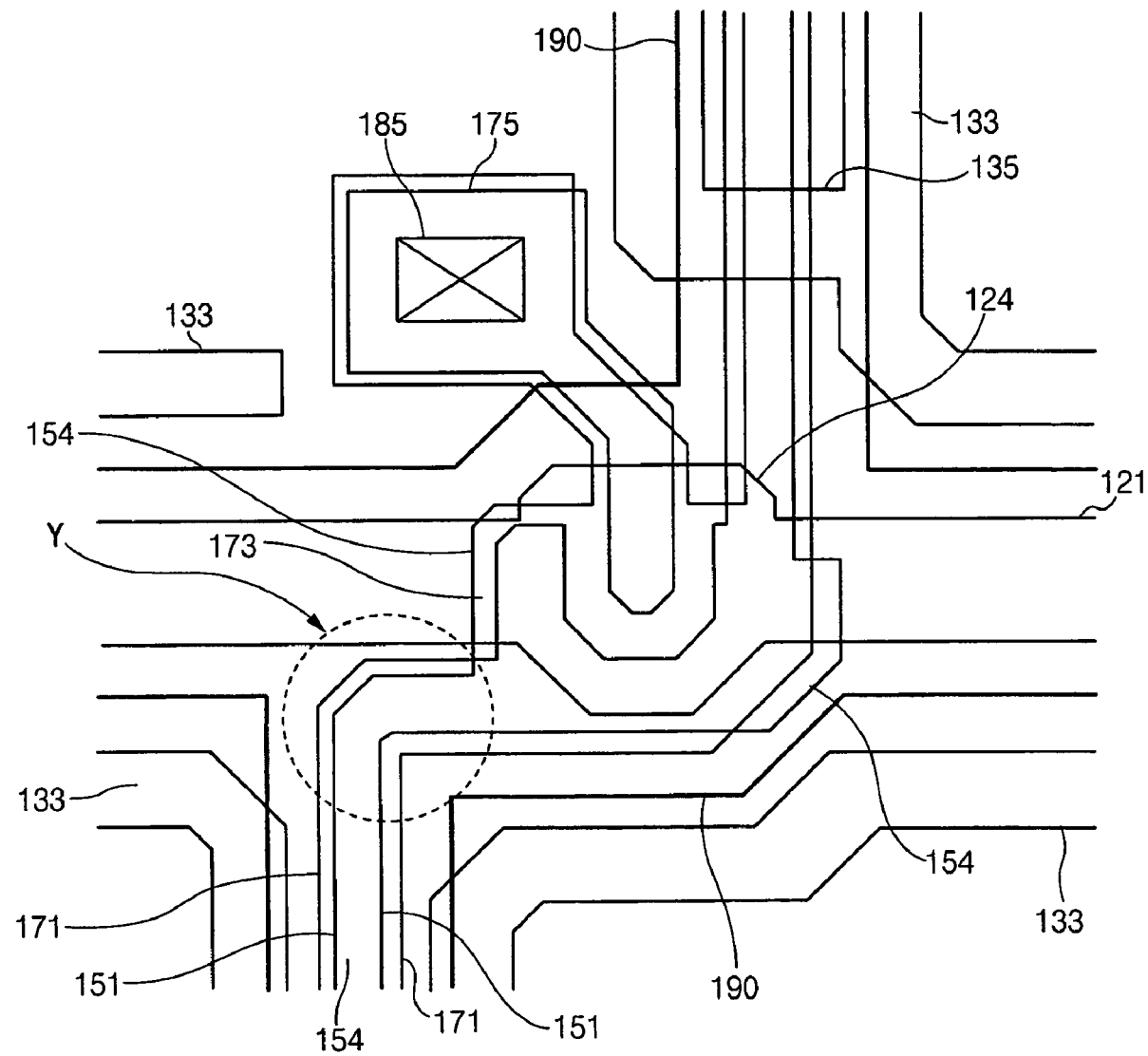
FIG. 11 is a layout view of a portion at the vicinity of a TFT in an exemplary TFT array panel for an LCD according to another embodiment of the present invention.

FIG. 11 is a layout view of a portion at the vicinity of a TFT in an exemplary TFT array panel for an LCD according to another embodiment of the present invention.

The structure of the TFT array panel according to this embodiment is nearly similar to the structure shown in FIGS. 9 and 10a to 10C.

As the structure of the TFT array panel shown in FIG. 11 is compared with that shown in FIG. 9, the gate electrode 124 shown in FIG. 11 projects upward and downward, while the gate electrode 124 shown in FIG. 9 projects only upward. Instead, the upwardly-projecting length thereof is smaller than that shown in FIG. 9. Accordingly, portions related thereto, including the drain electrodes 175, the source electrodes 173 and the data lines 171, the semiconductor stripes 151, and the ohmic contacts 161 and 165, shift downward, too.

In particular, a curved portion Y of the data line shown in FIG. 11 is spaced apart form the gate line 121, while the data line 171 shown in FIG. 9 is curved at a curved portion X disposed on the gate line 121 from the upward direction to the transverse direction. Accordingly, the overlapping area between the gate line 121 and the data line 161 is decreased such that capacitive load due to the overlap is reduced as compared with the configuration shown in FIG. 9.

A lower boundary of the pixel electrode 190 adjacent to the TFT shifts downward, while the upper boundary thereof shifts upward. Therefore, the lower area of the pixel electrode 190 is increased, while the upper area thereof is decreased, thereby substantially remaining the total aperture ratio.

In addition, since the drain electrode 175 shifts downward, a lower transverse portion of the storage electrode 133 is shortened as shown in FIG. 11.

Next, comparison of various characteristics of four color LCDs having the mosaic arrangements and the delta arrangements will be described.

A first mosaic arrangement where all the sub-pixels RP, GP, BP, and WP have equal size, a second mosaic arrangement shown in FIG. 3A where the white sub-pixel WP has an area equal to half of that of another sub-pixel RP, GP, or BP, a first delta arrangement shown in FIG. 9, and a second delta arrangement shown in FIG. 11 were designed under the same design rule and they were compared.

The area of each of the sub-pixels RP, GP, BP, and WP in the first mosaic arrangement was equal to 144.5 μm×144.5 μm. In the second mosaic arrangement, the area of each of the red, green, and blue sub-pixels RP, GP, and BP was equal to 144.5 μm×144.5 μm, and the area of the white sub-pixel WP was equal to half of the above-described area. In the first and second delta arrangements, the area of each of the red, green, and blue sub-pixels RP, GP, and BP was equal to 161 μm×144.5 μm, and the area of the white sub-pixel WP was equal to 95 μm×144.5 μm.

The aperture ratio, the resistance (Rd) of the data line 171, the parasitic capacitance (Cgd) between the gate line 121 and the data line 171 (including the drain electrode 175), the delay value (RC) of the data lines 171 were compared and illustrated in TABLE 1. The values of the resistance (Rd), the parasitic capacitance (Cgd), and the delay value (RC) shown in TABLE 1 are the values relative to those for the first mosaic arrangement.

TABLE 1

|  | Mosaic 1 | Mosaic 2 | Delta 1 | Delta 2 |
|---|---|---|---|---|
| Aperture ratio | 58.76% | 51.42% | 58.20% | 58.26% |
| Rd | 1 | 1 | 1.21 | 1.21 |
| Cgd | 1 | 1 | 1.37 | 0.89 |
| RC | 1 | 1 | 1.78 | 1.08 |

As shown in TABLE 2, the delta arrangements showed the aperture ratios substantially equal to that of the first mosaic arrangement, while they had the resistances (Rd) larger than those of the mosaic arrangements. The first delta arrangement exhibited the parasitic capacitance (Cgd) larger than those of the mosaic arrangements, and thus the delay value (RC) of the first delta arrangement was much larger than those of the mosaic arrangements. However, the second delta arrangement showed the parasitic capacitance (Cgd) much smaller than those of the mosaic arrangements since the overlapping area might be remarkably small. As a result, the delay value (RC) of the data line 171 in the second delta arrangement was nearly equal to those of the mosaic arrangements.

Referring to FIG. 1 again, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines $G_1$-$G_n$ of the panel assembly 300 and synthesizes the gate-on voltage Von and the gate off voltage Voff from an external device to generate gate signals for application to the gate lines $G_1$-$G_n$.

The data driver 500 is connected to the data lines $D_1$-$D_m$ of the panel assembly 300 and applies data voltages, selected from the gray voltages supplied from the gray voltage generator 800, to the data lines $D_1$-$D_m$.

The signal controller 600 controls the drivers 400 and 500, etc., and it modifies three color image data R, G, and B into four color image data R', G', B', and W'.

Now, the operation of the LCD will be described in detail. The signal controller 600 is supplied with three color input image signals R, G and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing and modifying the three color input image signals R, G and B into four color image signals R', G', B' and W' suitable for the operation of the panel assembly 300 on the basis of the input control signals and the input image signals R, G and B, the signal controller 600 provides the gate control signals CONT1 for the gate driver 400, and the processed and modified image signals R', G', B', and W' and the data control signals CONT2 for the data driver 500.

The gate control signals CONT1 include a scanning start signal STV for instructing to start scanning, at least a clock signal for controlling the output of the gate-on voltage Von, and so on.

The data control signals CONT2 include a horizontal synchronization start signal STH for informing of start of a horizontal period, a load signal LOAD for instructing to apply the data voltages to the data lines $D_1$-$D_m$, a inversion control signal RVS for reversing the polarity of the data voltages (with respect to the common voltage Vcom), and a data clock signal HCLK.

The data driver 500 receives a packet of the image data R', G', B' and W' for a sub-pixel row from the signal controller 600 and converts the image data R', G', B' and W' into analog data voltages selected from the gray voltages supplied from the gray voltage generator 800 in response to the data control signals CONT2 from the signal controller 600. Thereafter, the data driver 500 applies the data voltages to the data lines $D_1$-$D_m$.

Responsive to the gate control signals CONT1 from the signal controller 600, the gate driver 400 applies the gate-on voltage Von to the gate line $G_1$-$G_n$, thereby turning on the switching elements Q connected thereto. The data voltages applied to the data lines $D_1$-$D_m$ are supplied to the sub-pixels through the activated switching elements Q.

The difference between the data voltage and the common voltage Vcom is represented as a voltage across the LC capacitor $C_{LC}$, i.e., a pixel voltage. The LC molecules in the LC capacitor $C_{LC}$ have orientations depending on the magnitude of the pixel voltage, and the molecular orientations determine the polarization of light passing through the LC layer 3. The polarizer(s) converts the light polarization into the light transmittance.

By repeating this procedure by a unit of the horizontal period (which is indicated by 1H and equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (e.g., line inversion and dot inversion), or the polarity of the data voltages in one packet are reversed (e.g., column inversion and dot inversion).

Next, the inversion of four color LCDs according to embodiments of the present invention will be described in detail in reference with the FIGS. 12-15.

FIG. 12 illustrates an example of a polarity distribution of sub-pixels of an LCD having the mosaic arrangements shown in FIGS. 3A and 3B and performing 1×1 dot inversion and FIG. 13 illustrates an example of a polarity distribution of sub-pixels of an LCD having the delta arrangement shown in FIG. 4A and performing 1×1 dot inversion.

For the sub-pixel arrangements shown in FIGS. 12 and 13, adjacent sub-pixels have opposite polarities.

In the sub-pixel arrangement shown in FIG. 12, the same colored sub-pixels have the same polarity. However, in the delta arrangement shown in FIG. 13, the same colored sub-pixels adjacent to each other in the row direction have the same polarity but the same colored sub-pixels in two neighboring pixel rows have opposite polarities. That is, the delta arrangement shown in FIG. 13 exhibits the line inversion, thereby improving image quality without the crosstalk and flickering.

FIG. 14 illustrates an example of a polarity distribution of mosaicked sub-pixels of an LCD performing 2×2 dot inversion.

As shown in FIG. 14, the same colored sub-pixels exhibit 1×1 dot inversion such that the same colored sub-pixels adjacent in the row and column directions have opposite polarities. Accordingly, 2N×2 dot inversion applied to a four color LCD having the mosaic arrangement makes the same colored sub-pixels experiencing N×1 dot inversion.

FIG. 15 illustrates an example of a polarity distribution of sub-pixels of an LCD having the delta arrangement and performing 2×4 dot inversion.

As shown in FIG. 15, the same colored sub-pixels exhibit 1×1 dot inversion such that the same colored sub-pixels adjacent in the row and column directions have opposite polarities. Accordingly, when 2×4N dot inversion applied to a four color LCD having the delta arrangement makes the same colored sub-pixels experiencing N×1 dot inversion.

As described above, the relatively small white sub-pixel WP improves the luminance of the four color LCD and prevents the reduction of the color concentration, thereby enabling to display lively images. Furthermore, the delta arrangement equalizes the lengths of the data lines passing between the sub-pixels to remove the difference in the load due to the different lengths of the data lines, thereby preventing the image deterioration. Moreover, the reduction of the overlapping area between a data line and a gate line decreases the RC delay.

In addition, the selection of the shape of the basic pixel for rendering based on the image type to be displayed satisfies a user.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
a plurality of gate lines and a plurality of data lines intersecting each other; and
a plurality of pixels connected to the gate lines and the data lines, each pixel including red, green, blue, and white sub-pixels,
wherein the white sub-pixel is smaller than the red, green, and blue sub-pixels, each data line passes between two sub-pixels and has at least a curve portion, and the length of the data lines is substantially uniform.

2. The liquid crystal display of claim 1, wherein the sub-pixels have substantially an equal length, the white sub-pixel has a width smaller than the widths of the red, blue, and green sub-pixels, the sub-pixels are affanged to form a plurality of rows, the sub-pixels in each row are affanged in turn, and sub-pixel affangements in adjacent rows are shifted by a predetermined s number of sub-pixels.

3. The liquid crystal display of claim 2, wherein each row includes red, green, white, and blue sub-pixels sequentially arranged in a first direction, the red and white sub-pixels are adjacent in a second direction, and a straight line extending in the second direction and passing through a center of the red sub-pixel passes through a center of the white sub-pixel.

4. The liquid crystal display of claim 3, wherein each pixel comprises a red sub-pixel, a white sub-pixel adjacent to the red sub-pixel in the second direction, and green and blue sub-pixels adjacent to the white sub-pixel in the first direction.

5. The liquid crystal display of claim 3, wherein each pixel comprises a red sub-pixel, a green sub-pixel adjacent to the red sub-pixel in the first direction, and white and blue sub-pixels adjacent to the red and green sub-pixels in the second direction, respectively.

6. The liquid crystal display of claim 3, wherein the sub-pixels are subjected to 1×1 line inversion.

7. The liquid crystal display of claim 3, wherein the sub-pixels are subjected to 1×1 dot inversion.

8. The liquid crystal display of claim 2, wherein sub-pixel arrangements in adjacent rows are shifted by two sub-pixels.

9. The liquid crystal display of claim 1, wherein the liquid crystal display is subjected to sub-pixel rendering.

10. The liquid crystal display of claim 9, wherein the sub-pixels are arranged to form a plurality of rows, the sub-pixels in each row are arranged in turn, and sub-pixel affangements in adjacent rows are shifted by a predetermined number of sub-pixels.

11. The liquid crystal display of claim 10, wherein a logical pixel for the sub-pixel rendering comprises red and green sub-pixels adjacent to each other in a first row, and white and blue sub-pixels that belong to a second row adjacent to the first row and are adjacent to the red and green sub-pixels, respectively.

12. The liquid crystal display of claim 10, wherein a logical pixel for the sub-pixel rendering comprises a red sub-pixel in a first row, a white sub-pixel that belongs to a second row adjacent to the first row and is disposed adjacent to the red sub-pixel, and green and blue sub-pixels that belong to the second row and are disposed adjacent to the white sub-pixel.

* * * * *